US010197388B2

United States Patent
Mayer et al.

(10) Patent No.: US 10,197,388 B2
(45) Date of Patent: Feb. 5, 2019

(54) POSITION-MEASURING DEVICE ABLE TO MONITOR DEVIATIONS FROM A SETPOINT BEHAVIOR AND METHOD FOR OPERATING THE POSITION-MEASURING DEVICE

(71) Applicant: DR. JOHANNES HEIDENHAIN GMBH, Traunreut (DE)

(72) Inventors: Elmar Mayer, Nussdorf (DE); Daniel Frese, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 13/889,645

(22) Filed: May 8, 2013

(65) Prior Publication Data
US 2013/0301059 A1  Nov. 14, 2013

(30) Foreign Application Priority Data
May 8, 2012 (DE) .................. 10 2012 207 656

(51) Int. Cl.
G01B 11/26 (2006.01)
G01D 5/244 (2006.01)
(Continued)

(52) U.S. Cl.
CPC ......... *G01B 11/26* (2013.01); *G01D 5/24457* (2013.01); *G01D 3/08* (2013.01); *G01D 5/3473* (2013.01)

(58) Field of Classification Search
CPC ...... G01B 11/26; G01D 5/24457; G01D 3/08; G01D 5/3473
See application file for complete search history.

(56) References Cited

U.S. PATENT DOCUMENTS 3,276,010 A * 9/1966 Mountjoy .................... 341/9
4,712,088 A * 12/1987 Ernst ........................... 341/2
(Continued)

FOREIGN PATENT DOCUMENTS

DE  19800455 A1  7/1998
DE  112005002253 T5  10/2007
(Continued)

OTHER PUBLICATIONS

Parker Motion & Control, "Feedback Devices," Engineering Reference and Application Solutions, pp. A39-A44, XP055284917, Jul. 2007, http://www.compumotor.com/catalog/cataloga/A39-A44.pdf.*
(Continued)

*Primary Examiner* — Violeta A Prieto
(74) *Attorney, Agent, or Firm* — Hunton Andrews Kurth LLP

(57) ABSTRACT

A position-measuring device includes a measuring standard, a scanning unit, and a rotary bearing by which the measuring standard or the scanning unit is rotationally mounted. The measuring standard and the scanning unit are rotatable in relation to each other. The scanning unit generates output signals, on the basis of which a rotary angle associated with the relative motion of the measuring standard and the scanning unit is able to be determined. A monitoring device monitors the rotary bearing for the occurrence of bearing faults and is adapted to detect and analyze at least one measured variable for a plurality of different relative positions of the measuring standard in relation to the scanning unit, in order to determine deviations from a setpoint behavior of the measured variables on the basis of the measured variable detected for a plurality of relative positions.

25 Claims, 14 Drawing Sheets

(51) Int. Cl.
    *G01D 3/08*     (2006.01)
    *G01D 5/347*    (2006.01)

(56) References Cited

U.S. PATENT DOCUMENTS

| | | | |
|---|---|---|---|
| 5,774,074 A | 6/1998 | Cooper et al. | |
| 6,087,948 A * | 7/2000 | Oveby et al. | 340/635 |
| 6,438,860 B1 | 8/2002 | Glimm | |
| 7,009,360 B2 * | 3/2006 | Jin-woo et al. | 318/254.1 |
| 7,187,305 B2 | 3/2007 | Ellis et al. | |
| 8,031,334 B2 | 10/2011 | Lippuner et al. | |
| 8,539,811 B2 * | 9/2013 | Wilhelmy et al. | 73/1.75 |
| 2005/0167577 A1 * | 8/2005 | Kawai et al. | 250/231.18 |
| 2006/0061489 A1 * | 3/2006 | Ellis | H03M 1/308 |
| | | | 341/13 |
| 2008/0133176 A1 * | 6/2008 | Kashio et al. | 702/183 |
| 2009/0290781 A1 * | 11/2009 | Yannick | G01N 21/8806 |
| | | | 382/141 |
| 2010/0039656 A1 * | 2/2010 | Lippuner | G01D 5/24452 |
| | | | 356/616 |
| 2010/0180664 A1 | 7/2010 | Wilhelmy et al. | |

FOREIGN PATENT DOCUMENTS

| | | |
|---|---|---|
| DE | 10 2007 036 271 | 2/2009 |
| EP | 1944582 A1 | 7/2008 |
| JP | H07218239 A | 8/1995 |
| JP | H11325972 A | 11/1999 |
| JP | 2001074507 A | 3/2001 |
| JP | 2007248117 A | 9/2007 |

OTHER PUBLICATIONS

Way Back Machine Internet archive of Parker Motion & Control, "Feedback Devices," Engineering Reference and Application Solutions, pp. A39-A44, XP055284917; https://web.archive.org/web/*/http://www.compumotor.com/catalog/cataloga/A39-A44.pdf.*
A. Ernst, "Digital Length and Angle-Measurement Technology", 3rd Edition, p. 61 (Landsberg/Lech, 1998).
European Search Report issued in European Patent Application No. 13 15 4778, dated Jul. 12, 2016.
Parker Motion & Control, "Feedback Devices," Engineering Reference and Application Solutions, pp. A39-A44, XP055284917.

* cited by examiner

Prior Art

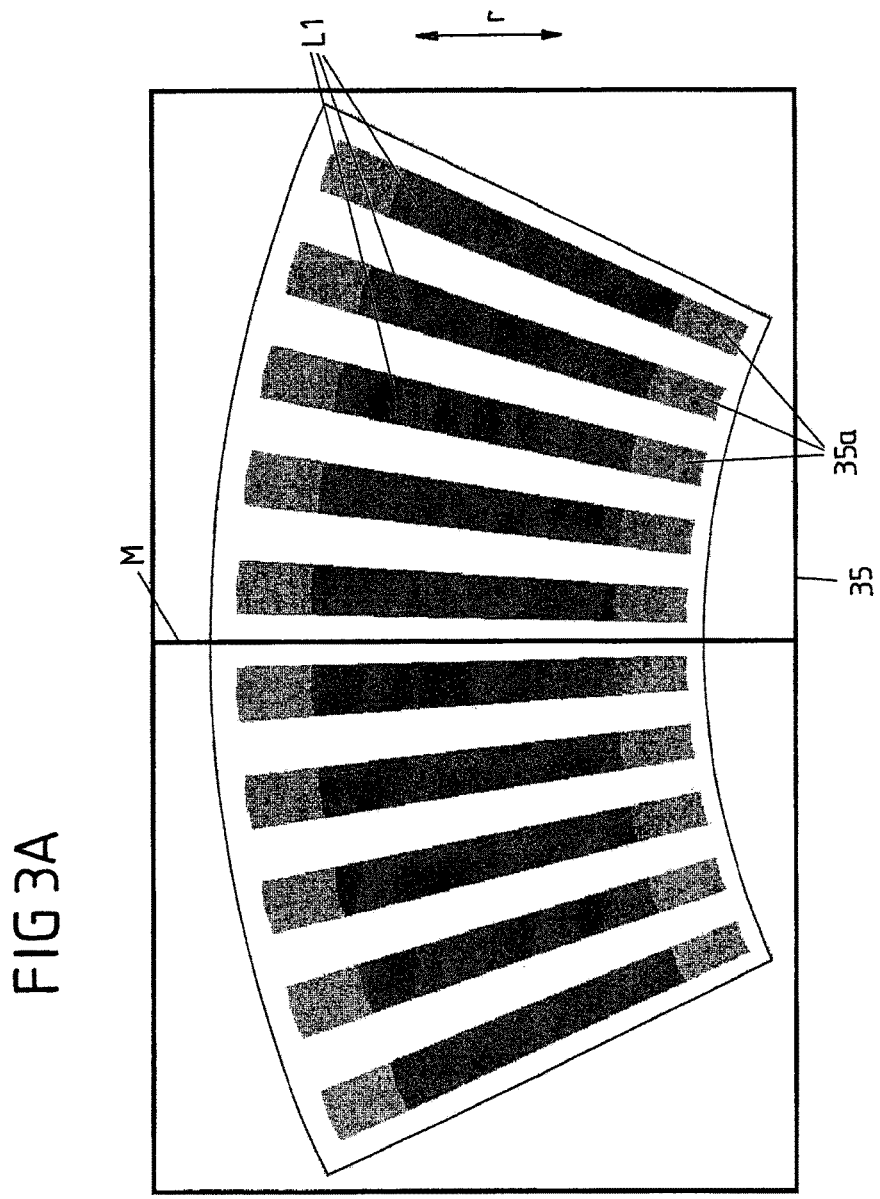

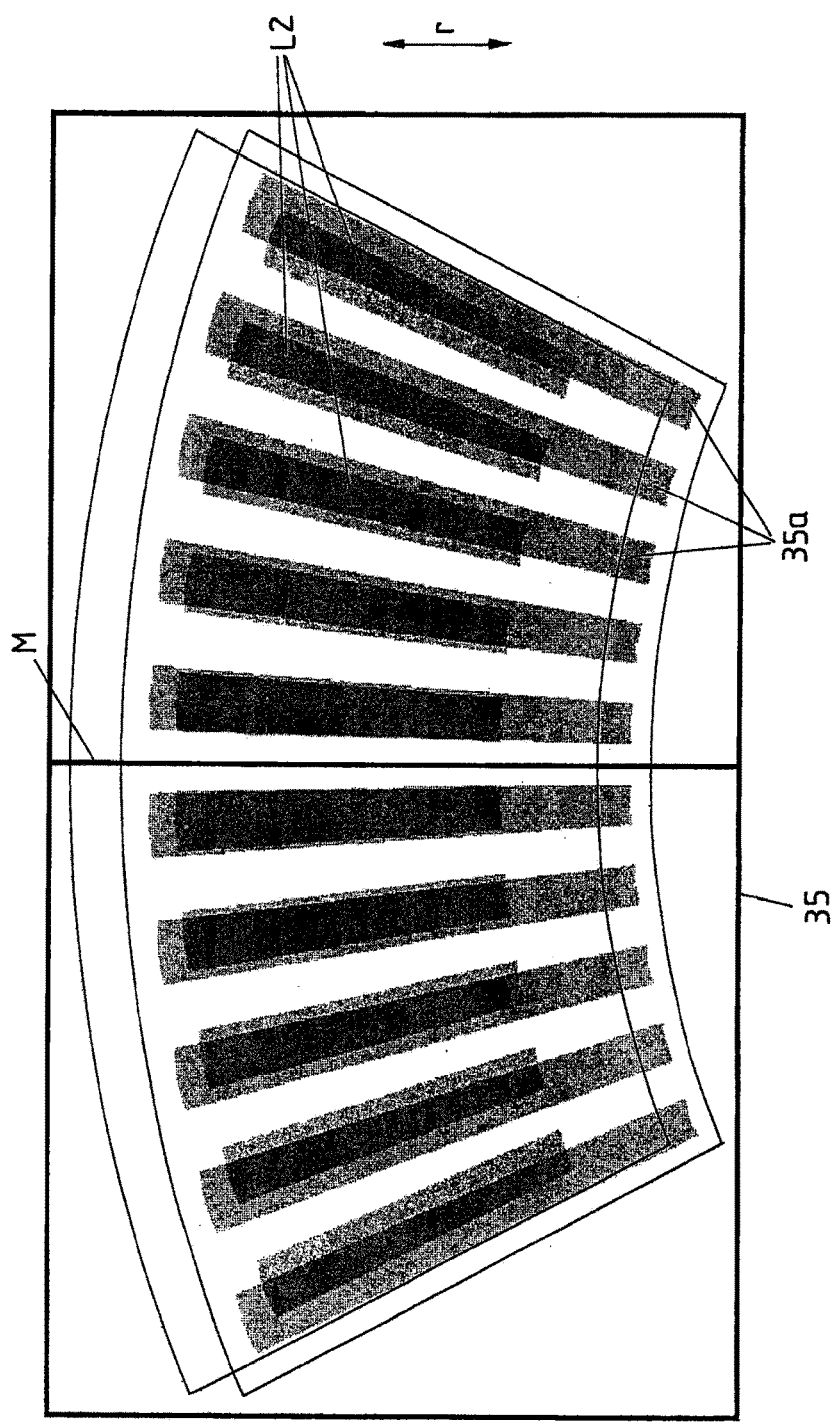

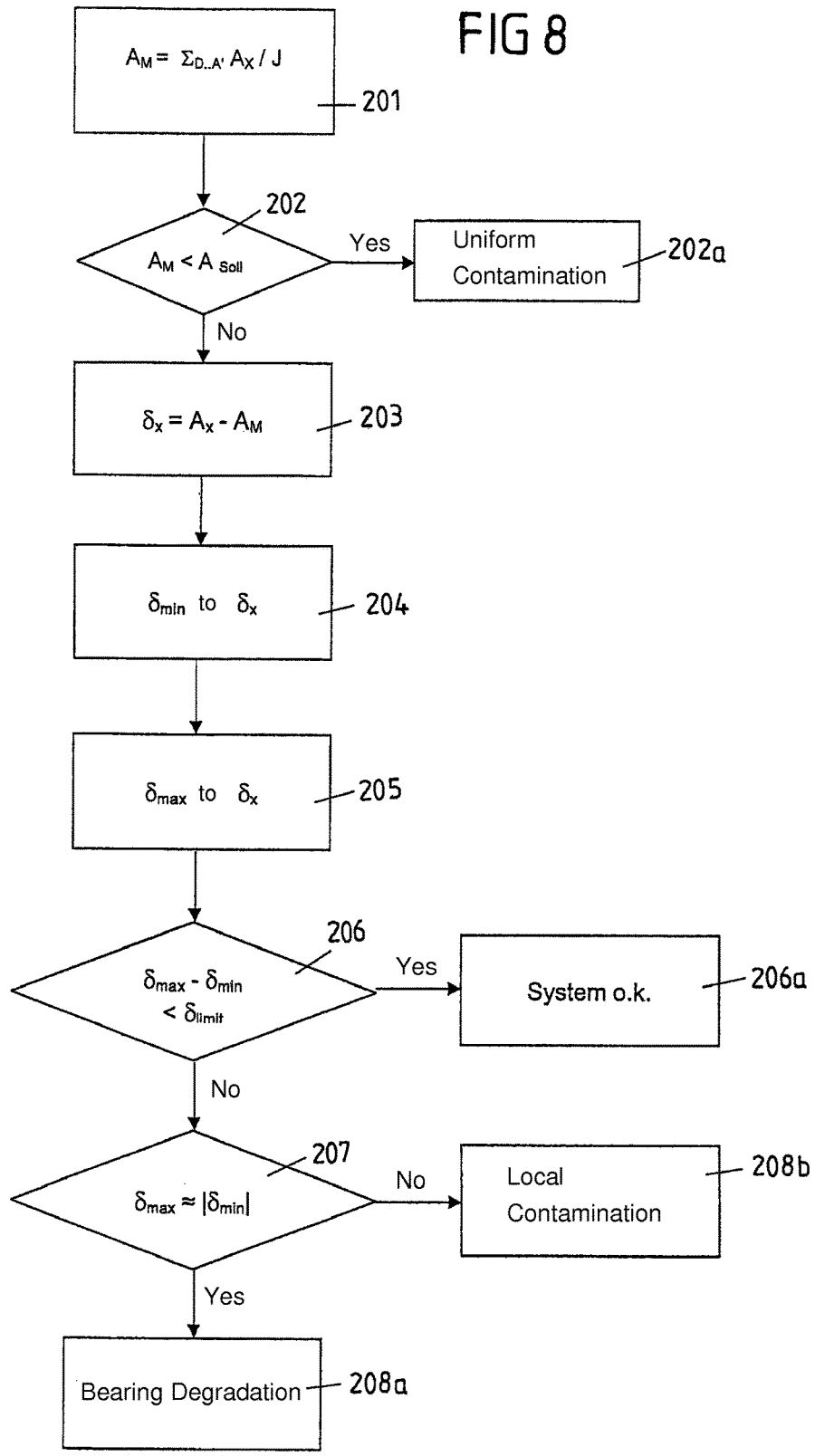

POSITION-MEASURING DEVICE ABLE TO MONITOR DEVIATIONS FROM A SETPOINT BEHAVIOR AND METHOD FOR OPERATING THE POSITION-MEASURING DEVICE

CROSS-REFERENCE TO RELATED APPLICATIONS

The present application claims priority to Application No. 10 2012 207 656.5, filed in the Federal Republic of Germany on May 8, 2012, which is expressly incorporated herein in its entirety by reference thereto.

FIELD OF THE INVENTION

The present invention relates to a position-measuring device and to a method for operating the position-measuring device.

BACKGROUND INFORMATION

A position-measuring device, in the form of an angle-measuring device, includes a measuring standard and a scanning unit, which are able to be rotated relative to each other in that at least one of the two mentioned components of the position-measuring device (measuring standard and/or scanning unit) is rotationally mounted by a bearing. The rotational mounting usually serves the purpose of joining the rotationally mounted component, especially the measuring standard, to a shaft to be measured, e.g., of a machine tool, which rotates or is pivoted within a limited angular range when the machine tool is in operation.

The measuring standard, for example, is formed by a graduated reference disk, on which a measuring graduation extends in circular form, which is scannable by the scanning unit such that positional changes of the measuring standard with respect to the scanning unit are able to be detected.

The scanning of the measuring standard by the scanning unit may be carried out on the basis of various physical principles, for example. by optical, magnetic, or inductive scanning. When scanning the measuring standard, the scanning unit generates analog (electrical) output signals during a relative movement (rotational movement) of these two components with respect to each other, from which information about the position of the measuring standard in relation to the scanning unit is able to be derived. Toward this end, (digital) positional data obtained from the output signals are analyzed by a processing unit and by a possibly post-connected sequential electronics system. Depending on whether the position-measuring device is an incremental or an absolute position-measuring system, information about positional changes of the measuring standard in relation to the scanning unit, and/or information about the particular rotational position of the measuring standard in relation to the scanning device is able to be obtained in the processing unit by analyzing the positional data generated by the position-measuring device. In addition, information about the speed of the relative movement (rotary motion) and about changes in speed, etc., are obtainable by analyzing the temporal change of the position of the measuring standard in relation to the scanning unit.

For one, highly precise mounting of the rotatable component, usually the measuring standard, is of importance for the perfect functioning of the position-measuring device. To achieve this accuracy, it—or the associated shaft of the position-measuring system—is supported (without play, if possible) by a precision bearing, e.g., in the form of a precision ball bearing.

It is furthermore important that contamination of the measuring standard and the elements of the scanning unit used for scanning the measuring standard is avoided, if at all possible. To do so, the measuring standard and also the elements of the scanning unit required for its scanning may be situated inside a housing, which offers protection from dust and moisture. The housing must have a sufficiently tight configuration for this purpose. Nevertheless, when a position-measuring device is operated (possibly for years), it is rarely possible to completely avoid factors that have an adverse effect on the bearing quality, and also contamination.

Both effects impair the quality of the position measurement (angle measurement), but have completely different causes, e.g., wear of the bearing on the one hand, and the intrusion of foreign bodies into the housing of the position-measuring device on the other. Depending on which one of the two effects is responsible for the worsened position measurement, different countermeasures must therefore be taken, e.g., an exchange of the rotary bearing in the one case, and removal of the contamination and/or a repair of improperly sealed spots on the housing in the other.

Against this background, conventional devices and methods for monitoring bearing wear of a position-measuring device (angle-measuring device), as described, for example, in German Published Patent Application No. 10 2007 036 271 have the disadvantage that they are unable to reliably distinguish between the effects of bearing wear and the effects of contamination of the measuring standard or the scanning unit.

SUMMARY

Example embodiments of the present invention provide a position-measuring device as well as a method for operating a position-measuring device, by which it is possible to reliably distinguish between a deterioration of the quality of the rotary bearing on the one hand and possible contamination especially of the measuring standard on the other.

According to example embodiments of the present invention, a monitoring device is provided, by which a measured variable (which may be linked to the output signals of the scanning unit or which is able to be generated from the latter) is detected and evaluated for a plurality of different relative positions, that is, different angular positions, of the measuring standard with respect to the detection device of the scanning unit, so that deviations from a setpoint behavior (e.g., a setpoint value) of the measured variable that is to be expected in a properly functioning position-measuring system are able to be detected.

Contamination, e.g., by dirt or fluid particles adhering to the measuring standard, normally affects a measured variable locally and irregularly, e.g., when, in a specific rotational position of the measuring standard with respect to the scanning unit, a contaminated region of the measuring standard is located in the scanning field of the scanning unit. Aside from such locally acting contamination, there may also be uniform contamination over a larger region on the measuring standard, e.g., in that a drop of oil is smeared over a large area on the measuring standard or a precipitate of abraded material or dust particles is uniformly distributed on it. Such contamination results in a uniform attenuation of a measured variable. By contrast, a deterioration of the bearing quality, triggered by wear of the rotary bearing, for example, results in a deviation from the setpoint values of the observed measured variable that not only causes local effects in a specific angular position of the measuring standard in relation to the scanning unit or that simply causes a uniform attenuation of the measured variable, but instead results in a (possibly continuous) regular, recurring (e.g., periodical) deviation of the behavior of the examined measured variable from the setpoint behavior of a properly functioning rotary bearing.

Wear of the rotary bearing therefore regularly results in (minor) eccentricities and/or a (minor) wobble motion of the rotatable component of the position measuring device (measuring standard and possibly associated shaft). Such an eccentricity or wobble motion affects the measured variables detectable by the scanning unit, for example, the signal parameters of the analog output signals produced by the scanning unit (in particular the signal amplitude and/or phase shifts of the output signals), in a (regularly) recurring, e.g., periodical, fashion. As a result, it can be distinguished from contamination effects by detecting and analyzing the measured variables for a plurality of different angular positions of the measuring standard in relation to the scanning unit, these contamination effects acting on the observed measured variable either uniformly or only locally, in a specific manner for specific angular positions.

The systems described herein are especially suited for (absolute) position-measuring systems (provided with a measuring standard that has an absolutely encoded measuring graduation), in which the current relative position (rotational position) of the measuring standard with respect to the scanning unit is directly ascertainable, rather than merely allowing measurements regarding positional changes. However, measurements regarding absolute positions are also possible for incremental position-measuring devices, provided the measuring standard has not only an incremental track, but also reference marks to which positional changes are able to be ascertained.

To detect bearing wear and distinguish it from contamination of the measuring standard, etc., it may, for example, be the case that the monitoring device records and analyzes measured variables at locations of the measuring standard that are located opposite each other, perpendicularly to the axis of rotation. For example, a wobble motion (as a substantially periodic motion) of the measuring standard due to bearing wear has a certain frequency or period duration (e.g., related to the rotary motion of the measuring standard that forms the basis), which manifests itself in a corresponding periodicity of the measured variables recorded and analyzed by the monitoring device. In this case, it should be expected that because of bearing wear and attendant wobbling, the measured variables at opposite points of the measuring standard (perpendicularly to the axis of rotation) each have (at least in absolute terms) a particular (characteristic) relationship with regard to their deviation from the particular setpoint value (in a properly operating bearing). Contamination on the measuring standard, on the other hand, would not lead to such a regular behavior of the measuring quantity.

To ascertain measured variables at different locations on the measuring standard (e.g., during a relative movement of scanning unit and measuring standard), it may be provided to subdivide the measuring standard into a plurality of (e.g., equal) segments and to form an average value of the measured variable to be analyzed for each individual segment. Via the monitoring device, it is possible to determine whether deviations between the behavior of the measured variable and the setpoint behavior have a regular (e.g., periodic) structure from segment to segment, or are distributed among the individual segments in irregular manner, or simply cause a uniform attenuation of the measured variable. The former case suggests wear of the bearing, whereas the latter case indicates local contamination or contamination across a large area.

To analyze the measured variables, it may furthermore be provided to form the average value of the measured variable for a complete rotary motion of the measuring standard in relation to the scanning unit, and to compare it to the values of the measured variable at particular locations or segments of the scanning unit.

When using the methods for analyzing measured variables, even position-measuring devices that execute only a limited turning motion (across an angle of less than 360°) of the measuring standard relative to the scanning unit are able to be monitored for bearing wear or contamination.

Especially quantities that are required for operating the position-measuring device as it is, e.g., the amplitude of the output signal generated by the scanning unit, or a phase shift of the output signals, are suitable as measured variables that are recorded and analyzed in the monitoring device. This will be explained in greater detail below with the aid of several exemplary embodiments.

For analysis, the measured quantities may be stored in a memory allocated to the monitoring device.

The information about bearing faults obtained according to example embodiments of the present invention may be used to generate and transmit a fault or warning signal to a sequential electronics system, for example. The sequential electronics system may in turn utilize such a signal to indicate a need for maintenance or a possibly imminent failure of a position-measuring device. In addition, the determination of bearing faults may be used to correct errors in the positional values (attributable to wobbling or eccentricity).

Further features and aspects of example embodiments of the present invention are described in more detail below with reference to the appended Figures.

BRIEF DESCRIPTION OF THE DRAWINGS

FIG. 3A schematically illustrates a detector unit, impinged upon by a light pattern of an associated scanning unit.

FIG. 3B schematically illustrates the system illustrated in FIG. 3A in a radial displacement of the measuring standard in relation to the detections device of the scanning unit.

FIG. 8 is a flow chart of an evaluation algorithm for detecting and distinguishing bearing faults and contamination in position-measuring devices which are limited in their rotation in relation to the scanning unit.

DETAILED DESCRIPTION

Figure 1:
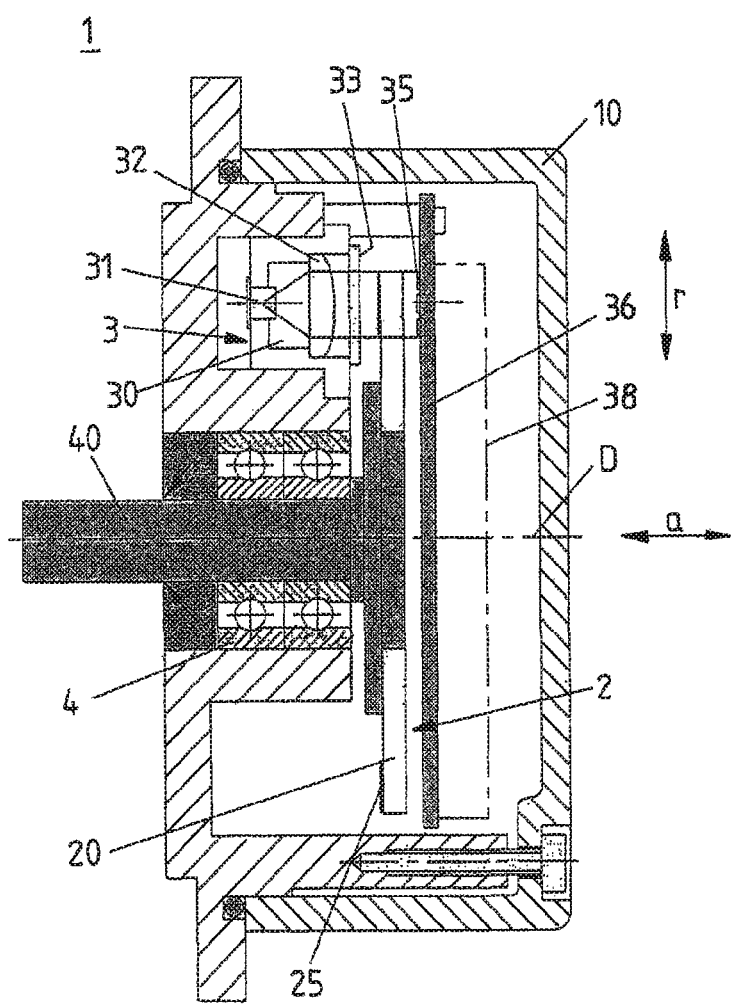
FIG. 1 is a schematic cross-sectional view of a position-measuring device having a rotationally mounted measuring standard in the form of a graduated reference disk, and a scanning unit for scanning the measuring standard.

FIG. 1, in a schematic cross-section, illustrates the structure of a position-measuring device 1 in the form of an angle-measurement system, which, as is generally conventional, includes a measuring standard 2 and a scanning unit 3 for scanning measuring standard 2.

Here, measuring standard 2 is formed by a graduated reference disk 20, on which a measuring graduation scale 25 extends along the edge (as a ring), e.g., in the form of an incremental graduation or a scale-division track encoded in absolute manner.

Measuring standard 2 is mounted so as to allow a rotation about axis D, using a rotary bearing 4 in the exemplary embodiment illustrated in FIG. 1, which in this particular case is arranged as precision ball bearing, for example. In the exemplary embodiment illustrated, the mounting of graduated reference disk 20, and thus of measuring standard 2, specifically is provided such that it is situated on a shaft 40 (in torsionally fixed manner), which is rotatable about axis D and in turn is mounted in pivot bearing 4.

Scanning unit 3 for scanning measuring standard 2, or measuring graduation scale 25 to be more precise, is arranged to scan measuring graduation 25 in photoelectric manner using electromagnetic radiation, which an illumination device 30 of scanning unit 3 supplies to measuring graduation scale 25. Illumination device 30 includes a radiation source 31, for example in the form of a semiconductor light source (LED), a collimator 32 for parallelizing the radiation emitted by light source 31, as well as an optional scanning plate 33, which is disposed between light source 31 and measuring graduation scale 25 and is part of the scanning unit, through which plate the parallelized electromagnetic radiation passes before impinging upon measuring graduation scale 25.

In the case at hand, measuring standard 2 and especially its measuring graduation scale 25 are arranged for photoelectric scanning, using transillumination methods, in particular. This means that the electromagnetic radiation emitted by illumination device 30 passes measuring standard 2 in reciprocal action with measuring graduation scale 25, and then impinges upon a detector or detection device 35 of scanning unit 3, formed by photodiodes in the exemplary embodiment, on the side facing away from measuring standard 2. Using this detector or detection device 35, it is possible to detect a relative motion (rotary motion) of measuring standard 2 about axis D (during a rotation of shaft 40) in, e.g., a conventional manner, and in the case of a measuring graduation scale 25 featuring absolute encoding, it is also possible to make direct measurements regarding the position of measuring standard 2 in relation to scanning unit 3. In the case at hand, the scanning of measuring standard 2 or associated measuring graduation scale 25 by scanning unit 3 takes place in axial direction a.

Instead of the transillumination method shown in FIG. 1, it is also possible to use the so-called vertical illumination method, in which illumination device 30 and detector or recording device 35 are situated in front of the same side of measuring standard 2, and the electromagnetic radiation emitted by illumination device 30 is modulated by reflecting and non-reflecting areas of measuring graduation scale 5 and detected by detector or recording device 35.

In addition to the photoelectric measuring principle described as an example, the scanning of a measuring standard 2 or an associated measuring graduation scale 25 may also be performed according to an inductive or magnetic measuring principle, for example.

Moreover, graduated reference disk 20 may also be arranged in cylindrical form, and measuring graduation scale 25 may be situated on its cylindrical outer surface. The scanning then takes place in radial direction r. Such a position-measuring device 1 is also referred to as a drum encoder. This system is considered advantageous especially for the photoelectric vertical illumination method and magnetic measuring principles.

When a position-measuring device of the type illustrated in FIG. 1 is in operation, it is connected to a machine shaft, for example, by its shaft 40, so that the rotation of the machine shaft is transmitted to shaft 40 of position-measuring device 1 and leads to a corresponding rotary motion of measuring standard 2 in the form of a graduated reference disk 20, which is mounted on shaft 40 in torsionally fixed manner, the rotary motion in turn being able to be detected through the cooperation of scanning unit 3 and measuring graduation scale 25 of measuring standard 2.

During operation, position-measuring device 1 generates analog (electrical) output signals at detector device 35, which normally are converted into digital positional data and then transmitted, for example, in serial form, to sequential electronics. There, information about the position of measuring standard 2 relative to scanning unit 3 (angle of rotation) and possibly about the speed and speed changes of measuring standard 2, and thus of shaft 40, are able to be obtained on a continuous basis by analyzing the positional data.

For a defined, highly precise position or angle measurement by position-measuring device 1, a defined (axial) clearance between components 31, 32, 33, 35 of scanning unit 3 and measuring graduation scale 25 of measuring standard 2, among other things, is of special importance. In the following text this is also referred to as the clearance between scanning unit 3 and measuring standard 2 (in axial direction a), for the sake of simplicity. In contrast, in the case of a drum encoder, as one previously mentioned possible variant, it is the distance in the radial direction that is important.

In addition, position-measuring device 1 has a housing 10, in which measuring standard 2 having measuring graduation scale 25, and scanning unit 3 are situated and which may be properly sealed in order to prevent fluid and dirt particles such as dust from gaining access to the interior of the housing, thereby preventing related contamination of measuring graduation scale 25 and scanning unit 3, in particular of detector device 35.

If a longer operation of position-measuring device 1 causes wear of bearing 4 on which measuring standard 2 is rotationally mounted (via shaft 40), this could result in eccentricity and/or wobble motions of measuring standard 2 while position-measuring device 1 is in operation. For one, this means that in a rotary motion of measuring standard 2 about axis of rotation D, each point of measuring graduation scale 25 may have a distance from axis of rotation D in radial direction r that is no longer constant—like it is in a motion along a true circular path that occurs with proper mounting—but which varies instead, i.e., specifically fluctuates around the value that would be encountered in a rotary motion along a circular path about axis of rotation D (eccentricity). For another, it is possible that in a rotary motion of measuring standard 2 in relation to scanning unit 3, the distance between components 31, 32, 32, 35 of scanning unit 3 and measuring standard 2, especially measuring graduation scale 25, varies in axial direction a (parallel to axis of rotation D) (wobble motion).

Related adverse effects on the precision of the measurement may also occur as a result of contamination of the system, especially if dirt particles have accumulated on measuring graduation 2.

Deviating from the exemplary embodiment illustrated in FIG. 1, it is not mandatory that the bearing (rotary bearing 4) of position-measuring device 1 be a so-called integral bearing, which, as illustrated in FIG. 1, is situated inside a housing 10 of position-measuring device 1. Instead, the bearing/rotary bearing of position-measuring device 1 may also be formed by a bearing situated outside of housing 10, for example, the rotary bearing of an engine or machine shaft, whose rotary motion is to be recorded by the position-measuring device. This bearing then assumes a dual function, as a rotary bearing of the shaft to be measured on the one hand, and as a rotary bearing of the position-measuring device on the other. Position-measuring systems in the form of angle-measurement systems with and without integral bearings are illustrated and discussed, for instance, in the specialized book "Digitale Längen-und Winkelmesstechnik" (Digital Length and Angle-Measurement Technology) by Alfons Ernst, 3rd edition (Landsberg/Lech, 1998) on pages 61 et seq.

One aim hereof is to be able to distinguish adverse effects on the position-measuring device caused by bearing faults (especially as a result of wear of rotary bearing 4) from adverse effects due to contamination. This makes it possible to determine whether bearing 4 needs to be exchanged in order to ensure a highly precise position measurement, or whether removal of contamination and possibly better sealing of housing 10 is required. A monitoring device, which in the exemplary embodiment illustrated in FIG. 1 is part of an electric or electronic module 38 that may be situated on a circuit board 36, is used for this purpose. This circuit board 36 may additionally also carry detector device 35, as illustrated in FIG. 1.

For example, module 38, indicated by a dot-dash line in FIG. 1, may be a module which controls the scanning of measuring standard 2 and controls radiation source 31 for this purpose, which furthermore is used as processing unit and, for example, processes, especially corrects, the (analog) signals generated by detector device 35, in order to use them to form (digital) positional measured values. Furthermore, it assumes the communication with sequential electronics. Monitoring device, which is used to detect bearing faults and whose functions will be discussed in greater detail in the following text, is also able to be integrated into such a module 38.

The monitoring device may also be implemented separately from the aforementioned modules of scanning device 3.

Important is merely that such an interaction with the position-measuring device, e.g., detector device 35 and/or an associated processing unit, takes place in order to record and analyze measured variables of the position-measuring device, which, for example, are able to be obtained from the analog (electric) output signals generated by detector device 35 in the manner described herein.

Figure 2A:
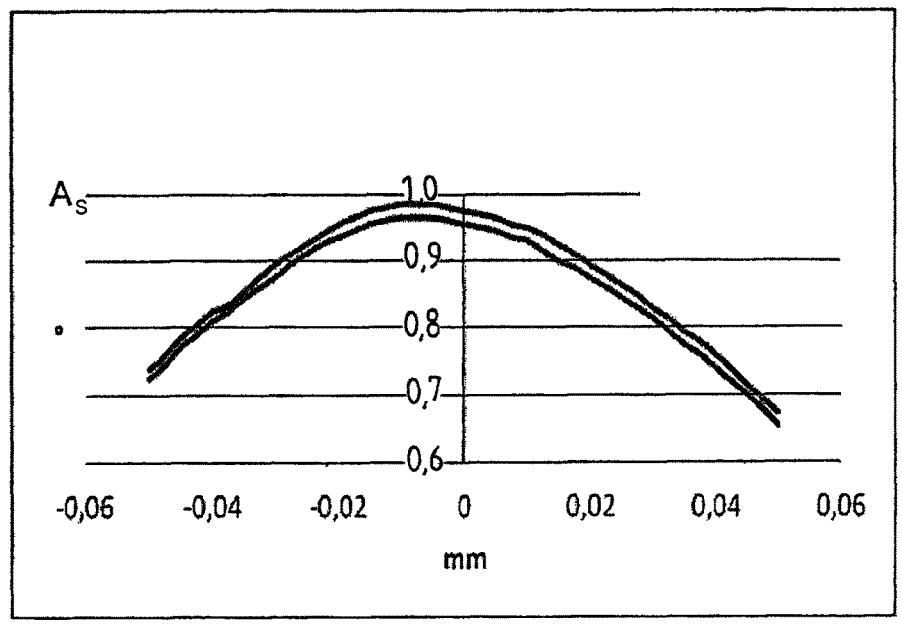
FIG. 2A schematically illustrates a measured amplitude of the output signal generated by the scanning unit as a function of the distance between the measuring standard and detection device of the scanning unit.

For example, FIG. 2A illustrates the dependency of the signal amplitude of the analog (electric) output signals, generated by position-measuring device 1 or, more precisely, by scanning unit 3, as a function of deviations of the distance between scanning unit 3 and measuring graduation scale 25 from a setpoint value (for a properly working bearing), i.e., for two measurements performed for example, according to the two curves illustrated in FIG. 2A.

As illustrated in FIG. 2A, signal amplitude $A_s$ has a maximum when the distance between scanning unit 3 and measuring standard 2 (scanning distance) corresponds to the setpoint value, i.e., the deviation (from the setpoint value) plotted on the x-axis of FIG. 2A just about has the value of 0. In FIG. 2A, reference is specifically made to the distance between measuring graduation scale 25 and detection unit 35 in the form of a structured photo sensor, as the scanning distance.

In the case of FIG. 2A, distance variations, both with an increase in the distance (corresponding to values greater than 0 mm on the x-axis) and with a reduction of the distance (corresponding to values of less than 0 mm on the x-axis) in comparison with the setpoint value, consequently lead to a reduced signal amplitude.

This results in the following option for detecting a wobble motion of measuring standard 2 due to positional errors:

First, the amplitude of the output signal of position-measuring device 1 or scanning unit 3 must be detected. This normally does not require a separate detection device because the signal amplitude is directly ascertainable from the actuating variable utilized to regulate light source 31, especially the brightness of light source 31. A continuous regulation of light source 31 while position-measuring device 1 is in operation is required in order to be able to compensate for aging effects and/or effects stemming from contamination of light source 31. The amplification factor of a control circuit of light source 31, especially an associated current source, may be used as actuating variable, from which the signal amplitude is in turn able to be determined.

In this context it is furthermore important that influences that are not related to a wobble motion of measuring standard 2, e.g., changes in the illumination quality or the parallelization (collimation) of the electromagnetic radiation used for scanning measuring graduation scale 25, are able to be compensated for. This may be managed in, e.g., a conventional manner, by recording the internal temperature of the system.

If the amplitude of the output signal of position-measuring device 1 is recorded across a complete revolution (360°) of measuring standard 2 and then stored and analyzed, it is possible to thereby identify a wobble motion of measuring standard 2 caused by a bearing fault. Since the characteristic curve of signal amplitude $A_s$ illustrated in FIG. 2A (as a function of the distance between detector device 35 and measuring graduation scale 25) has a maximum at the setpoint distance (deviation 0 mm), a wobble motion of measuring standard 2 is accompanied by a periodic (e.g., sinusoidal) variation of the distance between detector device 35 and measuring graduation scale 25, i.e., having a frequency (or period duration) as specified by the rotary motion of measuring standard 2 about axis of rotation D. This in turn causes a sinusoidal variation of the measured variable, in the form of the signal amplitude utilized for the analysis in this particular case.

The afore-described signal signature illustrated in FIG. 2A has as its characteristic feature that when deviations from the setpoint value occur, the signal amplitude decreases both in the direction of a smaller scanning distance and in the direction of a larger scanning distance, so that a maximum of the amplitude is found at the setpoint value. This is due to the fact that the largest amplitude is reached when the imaging is optimally focused, and the imaging worsens with each change from the setpoint value of the scanning distance, and thereby results in a drop in the signal amplitude.

Figure 2B:
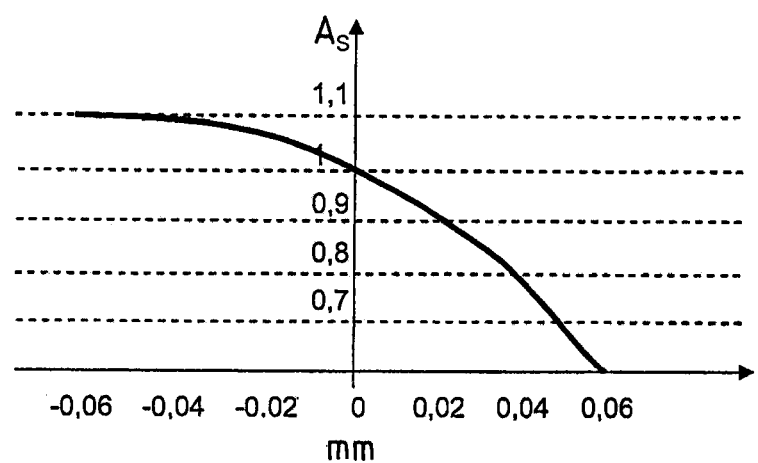
FIG. 2B is another schematic illustration of a measured amplitude of the output signal generated by the scanning unit as a function of the distance between the measuring standard and detection device of the scanning unit.

FIG. 2B schematically illustrates another potential signal signature for the dependency of amplitude $A_s$ of the analog output signal produced by position-measuring device 1 or scanning unit 3, from the scanning distance (between scanning unit 3 and measuring standard 2 or, more precisely, between detector device 35 and measuring graduation scale 25). In contrast to the signal signature illustrated in FIG. 2A, in this case the signal amplitude rises progressively, at least in the illustrated fluctuation range of the scanning distance of −0.06 mm to +0.06 mm, with decreasing scanning distance. This describes a configuration in which, when the scanning distance is reduced, the signal strength increases continuously, at least in a specific range about the setpoint value of the scanning distance.

Whether a dependency of the signal amplitude from the scanning distance featuring a signal signature illustrated in FIG. 2A or a signal signature illustrated in FIG. 2B is observed in the individual case depends on the specific configuration of the components of the utilized position-measuring device.

FIGS. 3A and 3B illustrate a possibility for detecting eccentricities of measuring standard 2 caused by bearing faults. In the case at hand, a phase P, or a phase shift, of the (analog) output signals of position-measuring device 1 or scanning unit 3 (rather than the signal amplitude as illustrated in FIG. 2A) is detected as measured variable.

FIG. 3A illustrates a light pattern L1 of the radiation emitted by light source 31, which impinges on detector device 35 following the reciprocal action with measuring graduation scale 25, i.e., for a properly working rotary bearing 4 and an attendant true rotary motion of measuring standard 2. In the exemplary embodiment illustrated, detector device 35 has a plurality of detector elements 35a, situated at a distance from each other, for the recording of light pattern L1 (structured detector).

FIG. 3B illustrates the system illustrated in FIG. 3A with eccentric mounting of measuring standard 2 due to bearing faults, which leads to a shift of resulting light pattern L2 in radial direction r in relation to detector device 35 or detector elements 35a.

In the case illustrated in FIG. 3A, where a light pattern L1 is recorded at detector device 35 with a properly working bearing or rotary bearing of the position-measuring device, there is a specific phase relation between light pattern L1 and detector elements 35a of detector unit 35. Detector elements 35a are arranged and situated (at a distance from each other) such that they form a structured detector, which in the exemplary embodiment resembles light pattern L1 to be detected. Specifically, in the exemplary embodiment illustrated in FIG. 3A, it is assumed for the sake of simplicity that the phase shift between detector elements 35a of detector device 35 and the individual stripes of light pattern L is constantly equal to zero (as usually endeavored in practice). It is also possible that even with an undisturbed bearing or rotary bearing of the position-measuring device—depending on the configuration of the position-measuring device—quite different phase relations may exist between the stripes of light pattern L1 and detector elements 35a of detector device 35. However, this will not be discussed here in greater detail because in the case at hand, it is predominantly the difference in the phase relations in an undisturbed rotary bearing, for one, as illustrated in FIG. 3A, and a disturbed rotary bearing for another, as illustrated in FIG. 3B that is of importance.

Figure 3C:
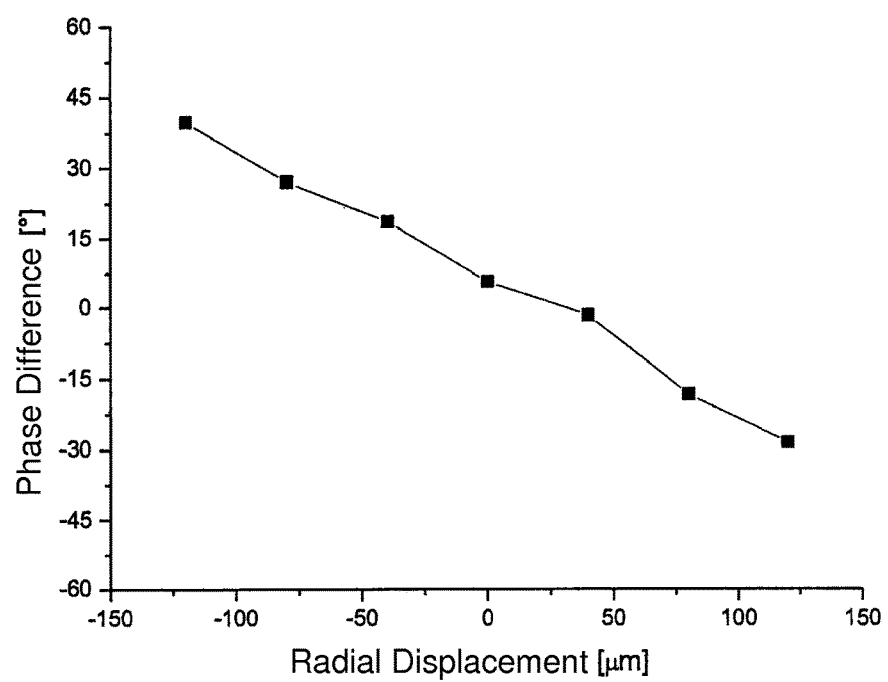
FIG. 3C schematically illustrates the phase shift in the output signal of the scanning unit as a result of a radial displacement as illustrated in FIG. 3B.

According to the situation illustrated in FIG. 3B, a bearing fault causes a shift of light pattern L2 in radial direction r in relation to detector device 35, or in relation to undisturbed light pattern L1, in comparison with the state without bearing faults illustrated in FIG. 3A. This radial shift of light pattern L2 in turn results in a phase shift—once again in relation to the undisturbed state as shown in FIG. 3A—it being the case here, for example, that a phase shift of light pattern L2 in relation to detector elements 35a of detector device 35, or in relation to undisturbed light pattern L1 occurs on both sides of an imaginary center line M of detector device 35, the phase shift being opposite but equal in its amount. In other words, the phase of light pattern L2 on the one side of center line M races ahead of the phase of detector elements 35a or undisturbed light pattern L1, but lags behind on the other side of center line M. This would just about cancel out the effects of the phase shift if the phase shift of light pattern L2 were determined as a whole on both sides of center line M (by addition) for detector device 35. However, if the regions on both sides of center line M of detector device 35 are analyzed separately in that, for one, the phase shifts on the one side and, for another, the phase shifts on the other side of center line M are added up and the difference is formed from the two individual results, then the individually resulting difference is a measure for the phase shift in relation to detector elements 35a of detector device 35, or in relation to undisturbed light pattern L1, which phase shift is caused by the radial shift of light pattern L2 (as a result of a bearing fault). And this resulting difference once again is proportional to the radial shift, as can be inferred from FIG. 3C.

Consequently, the following method may specifically be provided to detect an eccentricity of rotary bearing 4 using as measured variable the phase of the output signal of position-measuring device 1 or scanning unit 3:

By determining the phase shift between the current actual light pattern L2 and detector elements 35a of detector device 35 or undisturbed light pattern L1 separately, individually for the two halves of detector device 35 on both sides of center line M, and by subsequent subtraction of the individual results, a value for the measured "phase shift" variable is determined, as illustrated in FIG. 3C.

Influences on the measured variable that are independent of the eccentricity of rotary bearing 4 are once again compensated for, as already described above in the case of the measured "signal amplitude" variable.

Here, too, the measured "phase shift" variable is detected, stored and analyzed across a complete revolution of the measuring standard, as likewise already described in connection with the measured "signal amplitude" variable.

Since, according to FIG. 3C, the characteristic curve of the phase shift or the "phase difference" in relation to the radial offset (the radial shift) of actual light pattern L2 in relation to detector elements 35a of detector device 35, or in relation to undisturbed light pattern L1 is linear, a radial projection of the relative movement of measuring standard 2 in relation to scanning unit 3 in the presence of an eccentricity of bearing 4 leads to a periodic (sinusoidal) variation of the monitored measured variable.

If the determination of the phase difference is able to be made simultaneously on both sides of center line M of detector device 35, e.g., by separate shunting of the photoelectric current of detector elements 35a on both sides of center line M and subsequent copying of the currents, then it is possible to generate measured positional values simultaneously and to determine the shift in radial direction r (due to bearing faults).

In the following text, specific signal evaluation possibilities will be explained in greater detail using as an example the detection of a wobble motion and its differentiation from contamination effects by the signal amplitude.

Figure 4:
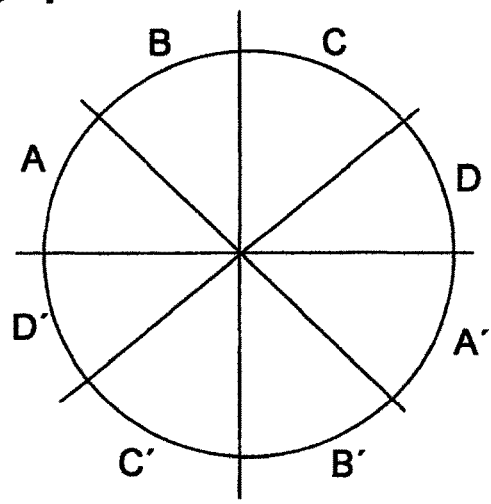
FIG. 4 schematically illustrates the subdivision of a measuring standard into segments, in which a monitored measured variable is detected in each case.

According to FIG. 4, a measuring standard 2 in the form of a graduated reference disk 20, see FIG. 1, is able to be subdivided into a plurality (in this case, uniform) segments A, B, C, D A', B', C', D', the segments being denoted such that segments A and A', B and B', C and C' and D and D' are situated opposite each other, or at a 180° offset.

If the individually examined measured variable is determined in a complete rotation of measuring standard 2 in each of said segments, as described earlier in connection with FIGS. 2A, 3A, and 3B, then it will be possible to form an average value of the examined measured variable for each segment. In this case, this is the signal amplitude, for example.

Depending on the number of examined segments—eight segments in the exemplary embodiment illustrated in FIG. 4—an appropriate memory is used for storing the values (average values) of the examined measured variable assigned to the individual segments. Given eight segments, an octant memory is provided, whereas a hexadecimal memory is provided in the case of sixteen segments.

The number of segments is advantageously even-numbered, in order to be able to assign each segment a segment located opposite, i.e., a segment shifted by 180°.

Figure 5A:
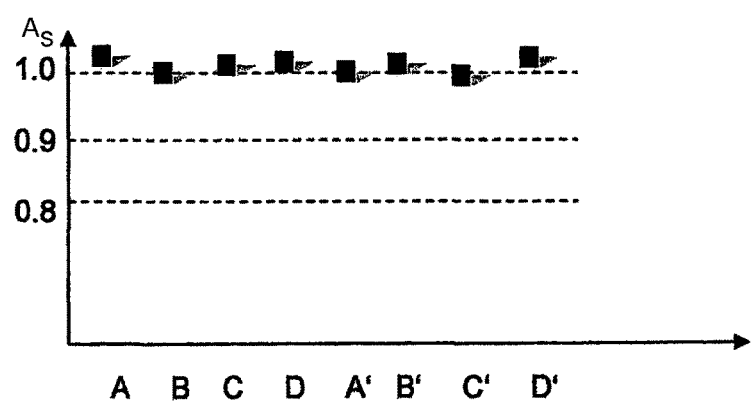
FIG. 5A schematically illustrates the characteristic of the signal amplitude across the individual segments illustrated in FIG. 4 for a position-measuring device with an intact bearing and no contamination.

FIG. 5A illustrates a signal amplitude $A_s$ in the individual segments A through D and A' through D' for a position-measuring system 1 having an intact rotary bearing 4. The amplitude values fluctuate within the allowed tolerance range around the amplitude value A z 1 to be expected for the signal amplitude according to FIG. 2A if the setpoint distance between scanning unit 3 and measuring standard 2 or measuring graduation scale 25 is present.

Figure 5B:
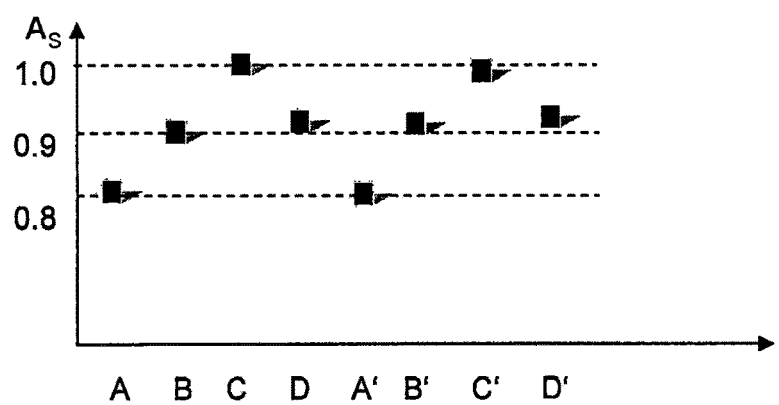
FIG. 5B schematically illustrates the characteristic of the signal amplitude across the individual segments illustrated in FIG. 4 for a position-measuring device with a defective bearing and no contamination.

FIG. 5B illustrates the curve of signal amplitude $A_s$ across the segments A to D and A' to D' in the case of a faulty bearing, which causes a wobble motion of measuring standard 2 during operation. A substantially periodic (sinusoidal) dependency of signal amplitude $A_s$ is clearly visible, the maximum values of signal amplitude $A_s$ located in segments C, C', in which during a wobble motion of measuring standard 2, the distance between the latter and the components of scanning unit 3 is approximately equal to the distance in the case of an undisturbed, proper rotary motion of the measuring standard. In all other segments A, B, D through B' and D', the (average) signal amplitude is smaller than in above-mentioned segments C and C', because deviations from the setpoint distance between scanning unit and measuring standard 2 illustrated in FIG. 2A always lead to a reduced signal amplitude $A_s$, regardless of whether the distance has increased or decreased.

Figure 5C:
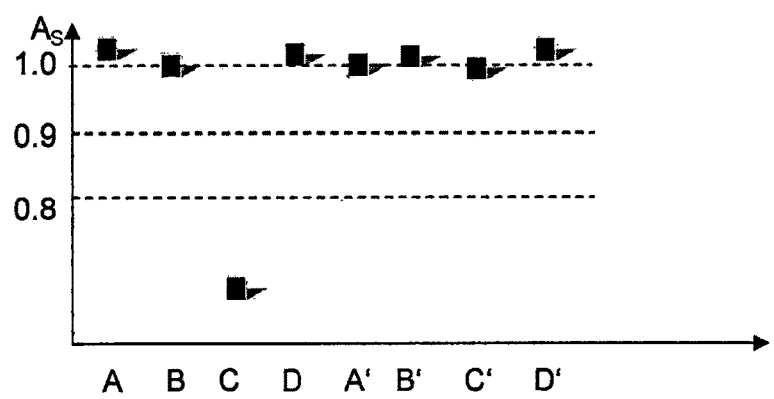
FIG. 5C schematically illustrates the characteristic of the signal amplitude across the individual segments illustrated in FIG. 4 for a position-measuring device with an intact bearing and local contamination of the measuring standard.
Figure 5D:
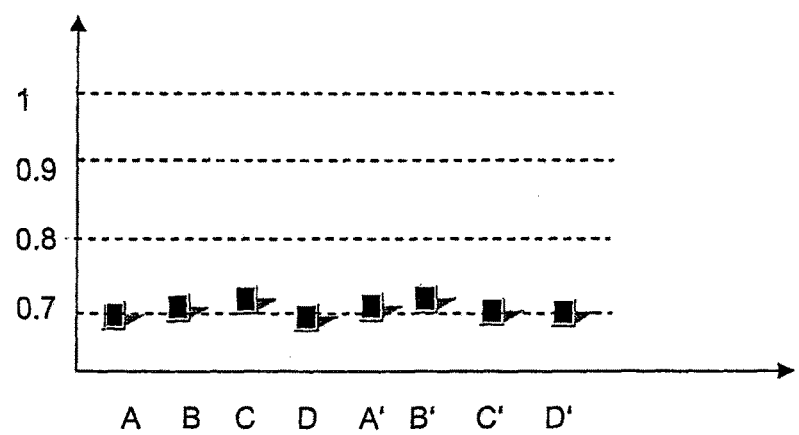
FIG. 5D schematically illustrates the characteristic of the signal amplitude across the individual segments illustrated in FIG. 4 for a position-measuring device with an intact bearing and uniform contamination of the measuring standard.

It should be noted that this is a substantially periodic (sinusoidal) signal, since the (average) signal amplitude $A_s$ in segments A and A', B and B', C and C' as well as D and D' located opposite each other is the same in each case (with the exception of tolerances) due to the periodicity of the wobble motion. This makes it possible to distinguish a wobble motion caused by a bearing fault quite clearly from local or also uniform contamination of measuring standard 2, inasmuch as the latter does not lead to a periodic dependency of signal amplitude $A_s$ from the position in the one or in the other segment. This is illustrated in FIG. 5C, for example, for local contamination in segment C, which leads to a reduced signal amplitude there (exclusively), and also with the aid of FIG. 5D, which illustrates the effect of uniform contamination of measuring standard 2 and/or aging or contamination of light source 31, i.e., a constant reduction of the signal amplitude.

On the basis of the characteristic differences, described with reference to FIGS. 5A to 5D, between a wobble motion as a result of a bearing fault on the one hand, and contamination on the other, the procedure, illustrated in the following in FIG. 6 in the form of a flow chart, is able to be provided for distinguishing between a bearing fault and contamination based on the analysis of the signal amplitude as measured variable.

A subdivision of measuring scale 2 into N segments X=A, B, C . . . is assumed, $A_x$ denoting the signal amplitude in segment X.

Figure 6:
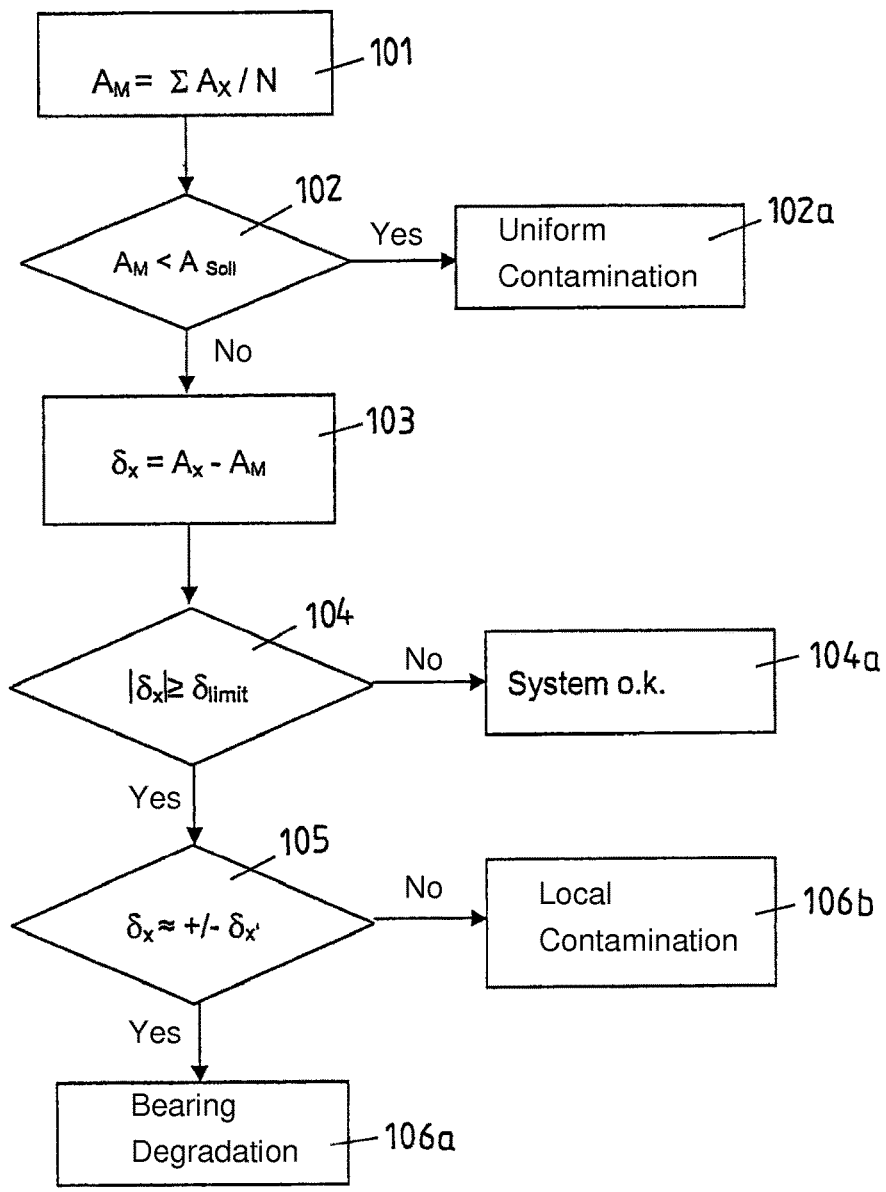
FIG. 6 is a flow chart illustrating an evaluation algorithm for distinguishing bearing defects on the one hand and contamination on the other.

According to first step 101 illustrated in FIG. 6, an average value $A_M$ of the signal amplitude across all N segments is formed to begin with.

In next step 102, it is checked whether this average value $A_M$ is smaller than a predefinable setpoint value $A_{Setpoint}$. If this is the case, a uniform drop in the monitored measured variable (signal amplitude $A_s$) and, accordingly, uniform contamination of measuring standard 2 or aging and/or contamination of light source 31 are/is inferred (102a).

Otherwise, deviation $\delta_X$ of local signal amplitude $A_X$ from average signal amplitude $A_M$ is subsequently determined for each individual segment X. (step 103).

In a further step 104, it is checked whether the amount of individual deviation $\delta_X$ exceeds a limit value $\delta_{limit}$. Limit value $\delta_{limit}$ represents fluctuations of the signal amplitude, which may occur even in bearings that are considered to be fully functional, because no bearing is able to produce a perfect rotary motion. If no deviations $\delta_X$ occur that exceed limit value $\delta_{limit}$, the system is considered to be fully functional (104*a*).

In all other cases, it is checked in a step 105 whether the afore-defined deviation $\delta$ is identical in absolute terms in segments X and X' that are located diametrically opposed, that is to say, that it differs by no more than the algebraic sign. If this is the case, a bearing fault ("bearing degradation") is detected in this step at 106*a*. Otherwise, contamination is inferred in this step 106*b*, especially contamination of measuring standard 2 or measuring graduation scale 25.

Figure 7A:
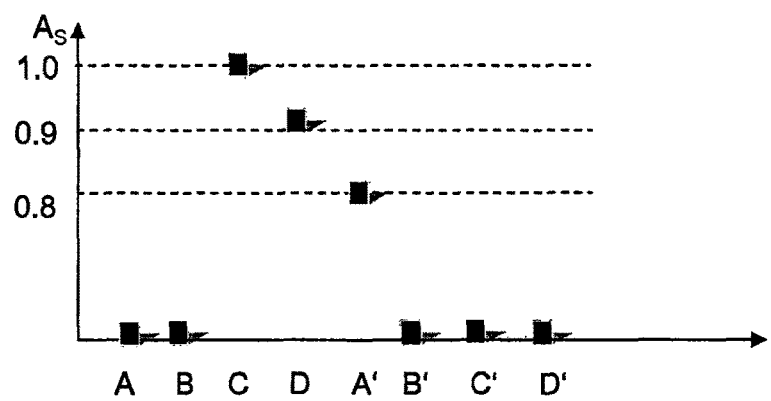
FIG. 7A schematically illustrates a potential characteristic of the amplitude of the output signal of the scanning unit in a position-measuring device featuring a measuring standard which is limited with regard to its rotation in relation to the scanning unit, and a defective bearing.

The analysis of the monitored measured variable must be performed in more differentiated fashion if the measuring standard does not rotate to its full extent in relation to the scanning unit while the position-measuring device is operating, but is pivotable by only a limited pivot angle of less than 360° in relation to the scanning unit. In this case scanning unit 2 always scans only a portion of segments A through D' of measuring standard 2 when position-measuring device 1 is in operation. That is to say, a measured value of the monitored measured variable (e.g., the signal amplitude) is able to be provided for only a portion of said segments. This is illustrated in FIG. 7A, for example, for a case in which only three segments C, D and A' of measuring standard 2 are able to be detected by scanning unit 3 while the position-measuring device is in operation (so-called pivot-angle operation). For all other segments A, B and B' through D' that are not detected by scanning unit 3 when position-measuring device 1 is operated, the associated memory area in which the particular amplitude value is to be stored remains at its default value, which has been selected as zero in the present case.

FIG. 7A illustrates a typical characteristic in the event of a bearing fault that leads to wobbling in the motion of measuring standard 2. However, because only a limited angular range of measuring standard 2 of scanning unit 3 is detected in this case, the characteristic curve of signal amplitude $A_s$ across segments A through D' does not produce a periodic curve (as in the case of FIG. 5B), but only a section of such a curve.

Figure 7B:
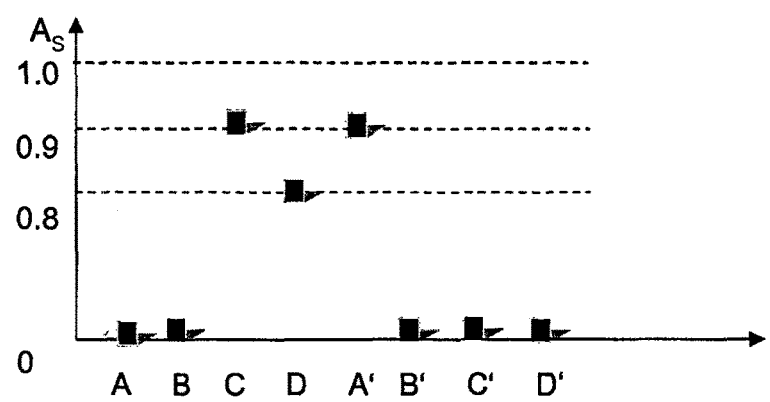
FIG. 7B schematically illustrates another potential characteristic in a situation illustrated in FIG. 7A.

Referring to FIG. 7B, it furthermore becomes clear that—depending on in which segments the wobble motion leads to an especially strong deviation from the setpoint distance between measuring standard 2 and scanning unit 3—quite different signal characteristics can be expected in a bearing fault and an attendant wobble motion in the case of the pivot-angle operation examined here, each showing a different segment from a periodic curve.

For the detection of a bearing fault and the differentiation of contamination, in particular the following points must also be taken into account in a pivot-angle operation of a position-measuring device:

First, it must be detected in which memory areas current measured amplitude values that relate to the segment of the measuring standard associated with the particular memory area were stored to begin with. This is done by comparing the current memory content to the original memory content, so that it can be detected which segments of the measuring standard are detected by scanning unit 3 in the pivot-angle operation (featuring a limited pivot angle).

The subsequent analysis of the monitored measured variable is then restricted to the values of the measured variable that are contained in the actually modified memory areas, i.e., to the memory areas that are assigned to segments C, D and A' in the case at hand.

Since in a pivot-angle operation, it is impossible to simply utilize the examination of a periodicity of the resulting signal characteristic for distinguishing between bearing faults and contamination, it may be provided to implement a finer subdivision of measuring standard into individual segments and to store the value of the monitored variable ascertained for a particular segment in an associated memory area again. Instead of a subdivision of measuring standard 2 into eight segments, it is also possible to examine 16, 32, or more segments, for example.

Figure 7C:
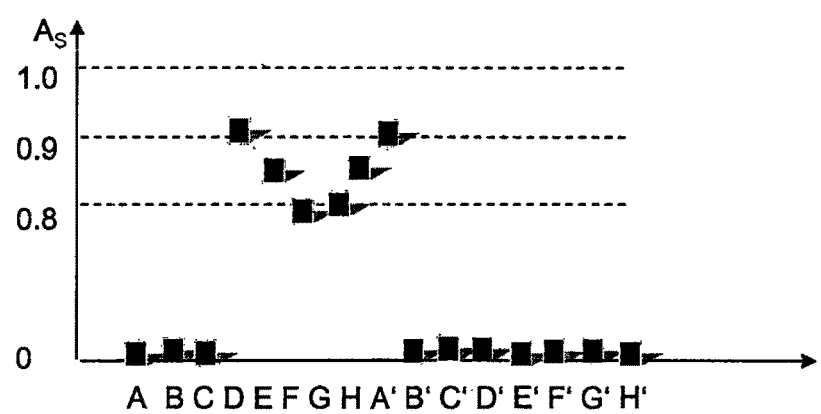
FIG. 7C schematically illustrates a refined representation of the characteristic illustrated in FIG. 7B.

FIG. 7C illustrates a characteristic, corresponding to that of FIG. 7B, of signal amplitude $A_s$ across segments A through H' of a measuring standard 2 in pivot-angle operation in the case of a defective bearing, a subdivision into a total of 16 segments having been made.

In the following text, it should be assumed, for example, that only segments D through A' are detected by scanning unit 3 while position-measuring device 1 is in operation, so that a value of signal amplitude $A_s$ that deviates from the default value therefore is stored for these segments in the associated memory areas.

Although in the pivot-angle operation examined here it is no longer possible to focus on a periodicity of the resulting signal characteristic in order to distinguish bearing faults from contamination, a differentiation between bearing faults and contamination is possible on the basis of a check as to whether the resulting signal characteristic exhibits certain regularities that stem from the periodicity of the wobble motion or eccentric motions caused by bearing faults, even if only a portion of this periodic motion is detectable in pivot-angle operation.

A suitable analysis of the detected measured variable in such a case, here, signal amplitude $A_s$, is illustrated with the aid of FIG. 8:

According to a first step 201, average value $A_M$ of the examined measured variable (signal amplitude $A_s$) is formed for all J segments (of the total of N segments) detected by scanning unit 3 during the limited pivot motion of measuring standard 2.

In a subsequent step 202, it is queried whether average value $A_M$ of the examined measured variable (signal amplitude $A_s$) is smaller than a specifiable setpoint value $A_{Setpoint}$. If the answer is yes, uniform contamination of measuring standard 2 or aging and/or contamination of light source 31 are/is inferred (202*a*).

In all other cases, in method step 203, deviation $\delta_X$ of the local signal amplitude $A_X$ from average signal amplitude $A_M$ is determined for each other segment D through A' to be taken into account. Furthermore, in another step 204, the particular deviation $\delta_X$ is determined that deviates the most from average value $A_M$ of the signal amplitude in the negative direction, and the value of $\delta$ min is set thereto. In a corresponding manner, the particular deviation $\delta_X$ that deviates the most from average signal amplitude $A_M$ in the positive direction is determined in step 205, and the value of $\delta_{max}$ then is set thereto.

Furthermore, in a step 206 it is checked whether the difference of deviation $\delta_{max}$ and $\delta_{min}$ is smaller than a limit value $\delta_{limit}$. If this is the case, the bearing is assumed to be operating properly (206*a*).

In the other case, it is checked (at 207) whether $\delta_{max}$ and $\delta_{min}$ have approximately the same absolute value in the algebraic sign. In this case, a bearing fault is assumed ("bearing degradation"), see 208*a*, and otherwise, "contamination" is assumed, see 208*b*.

This procedure is based on the assumption that a wobble motion caused by bearing faults has as a result that the values of the signal amplitude detected in different segments of the measuring standard in principle fluctuate uniformly about the average value averaged across all segments. This simplified assumption will not always prove true for all random bearing faults, which, for example, may lead to superimpositions of eccentricity, wobble motions and possibly still further deviations from normal motions of measuring standard 2. The analysis method would then have to be supplemented or broadened accordingly.

Figure 9A:
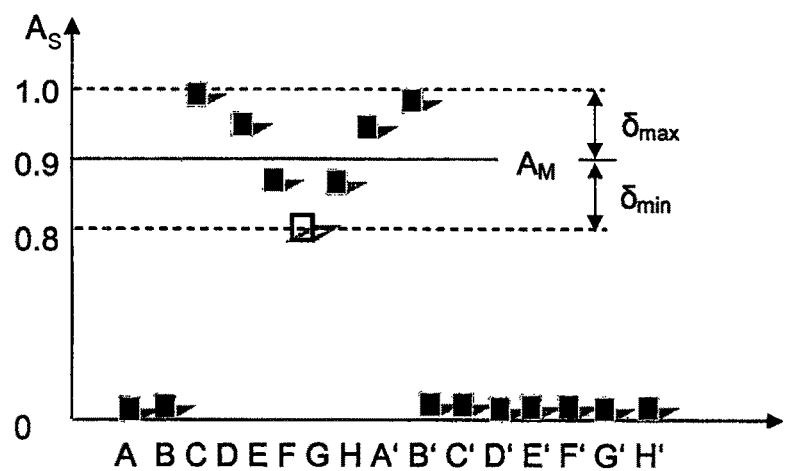
FIG. 9A schematically illustrates the results of the evaluation algorithm illustrated in FIG. 8 in case of a bearing fault.
Figure 9B:
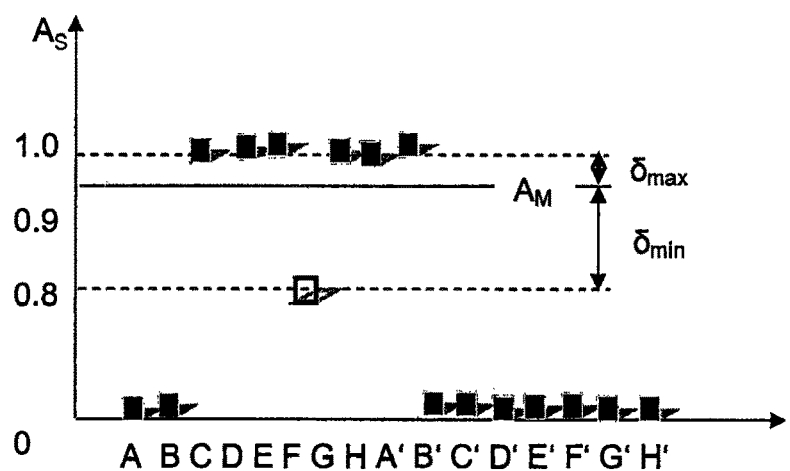
FIG. 9B schematically illustrates the results of the evaluation algorithm illustrated in FIG. 8 in case of contamination of the measuring standard.

FIG. 9A once again schematically illustrates a potential amplitude characteristic A for a pivot-angle operation in the presence of a bearing fault and an attendant wobble motion of measuring standard 2, which leads to opposite equal values of $\delta_{max}$ and $\delta_{min}$ in relation to the average value of amplitude $A_M$ (averaged across all examined segments C through A', or detected by the scanning unit during the pivoting motion). Local contamination in only one segment, for which a characteristic amplitude characteristic is illustrated in FIG. 9B, on the other hand, leads to completely different deviations $\delta_{max}$ and $\delta_{min}$ from amplitude $A_M$ averaged across all segments, because the basic signal characteristic is by no means regular, but leads to a deviation from the setpoint amplitude only at the location of the contamination, in this case, in segment F. And uniform contamination of the measuring standard behaves like a multitude of such local contaminations.

What is claimed is:

1. A position-measuring device, comprising:
   a measuring standard;
   an optical scanner unit adapted to scan the measuring standard for position-determination;
   a rotary bearing, the measuring standard and the optical scanner unit being rotatable in relation to each other via the rotary bearing when the position-measuring device is in operation, the optical scanner unit adapted to generate output signals, on which an angle of rotation associated with the relative movement of the measuring standard and the optical scanner unit is determinable; and
   a monitor device adapted to monitor the rotary bearing for occurrence of bearing faults by detection and analysis of (a) an amplitude of the output signals of the optical scanner unit, on which the angle of rotation associated with the relative movement of the measuring standard and the optical scanner unit is determinable, and/or (b) a phase of the output signals of the optical scanner unit, on which the angle of rotation associated with the relative movement of the measuring standard and the optical scanner unit is determinable, at each of a plurality of different, specific relative positions of the measuring standard in relation to a detector device of the optical scanner unit during a revolution, by comparing (a) the amplitude of the output signals of the optical scanner unit, on which the angle of rotation associated with the relative movement of the measuring standard and the optical scanner unit is determinable, and/or (b) the phase of the output signals of the optical scanner unit, on which the angle of rotation associated with the relative movement of the measuring standard and the optical scanner unit is determinable, at each of the specific relative positions to a respective setpoint value for each specific relative position, the monitor device adapted to determine a bearing fault based on the detection, analysis, and comparison;
   wherein (a) the amplitude of the output signals of the optical scanner unit, on which the angle of rotation associated with the relative movement of the measuring standard and the optical scanner unit is determinable, and/or (b) the phase of the output signals of the optical scanner unit, on which the angle of rotation associated with the relative movement of the measuring standard and the optical scanner unit is determinable, constitutes a measured variable.

2. The position-measuring device according to claim 1, further comprising a memory assigned to the monitor device and adapted to store the measured variable detected for different relative positions of the measuring standard in relation to the optical scanner unit.

3. The position-measuring device according to claim 1, wherein the measured variable is detected at a plurality of locations of the measuring standard.

4. The position-measuring device according to claim 3, wherein the locations of the measuring standard at which the measured variable is detected in each case are formed by segments of the measuring standard.

5. The position-measuring device according to claim 3, wherein the locations of the measuring standard at which the measured variable is detected in each case are distributed on the measuring standard in axially symmetric manner.

6. The position-measuring device according to claim 3, wherein for each location of the measuring standard at which the examined measured variable is detected, a diametrically opposed location of the measuring standard is provided, at which the examined measured variable is detected as well, diametrically opposed locations of the measuring standard being able to be transferred into each other by a 180° rotation.

7. The position-measuring device according to claim 4, wherein an average value of the measured variable for a particular segment of the measuring standard is utilized as representative of the examined measured variable.

8. The position measuring device according to claim 1, wherein the monitor device is adapted to analyze variations of the examined measured variable as a function of the relative position of the measuring standard in relation to the optical scanner unit.

9. The position-measuring device according to claim 8, wherein for the analysis, the examined measured variable is checked for periodicity.

10. The position-measuring device according to claim 8, wherein for the analysis, the examined measured variable is monitored for deviations from an average value that results when averaging the examined measured variable across a maximally possible relative movement of the measuring standard and the optical scanner unit of up to 360°.

11. A method for operating a position-measuring device, comprising:
    scanning a measuring standard by an optical scanner unit for a position measurement while the measuring standard and the optical scanner unit are rotated with respect to each other by a rotary bearing;
    checking the rotary bearing for bearing faults by a monitor device while the position-measuring device is in operation;
    detecting and analyzing, by the monitor device, (a) an amplitude of output signals of the optical scanner unit, on which an angle of rotation associated with relative movement of the measuring standard and the optical scanner unit is determinable, and/or (b) a phase of the output signals of the optical scanner unit, on which the angle of rotation associated with the relative movement of the measuring standard and the optical scanner unit is determinable, at each of a plurality of different, specific relative positions of the measuring standard in relation to a detection device of the optical scanner unit during a revolution, by comparing (a) the amplitude of the output signals of the optical scanner unit, on which the angle of rotation associated with the relative movement of the measuring standard and the optical scanner unit is determinable, and/or (b) the phase of the output signals of the optical scanner unit, on which the angle of rotation associated with the relative movement of the measuring standard and the optical scanner unit is determinable, at each of the specific relative positions to a respective setpoint value for each specific relative position; and determining a bearing fault based on the detecting, analyzing, and comparing;

wherein (a) the amplitude of the output signals of the optical scanner unit, on which the angle of rotation associated with the relative movement of the measuring standard and the optical scanner unit is determinable, and/or (b) the phase of the output signals of the optical scanner unit, on which the angle of rotation associated with the relative movement of the measuring standard and the optical scanner unit is determinable, constitutes a measured variable.

12. The method according to claim 11, wherein the measured variable is detected for a plurality of different, specific relative positions of the measuring standard in relation to a detection device of the optical scanner unit, a rotary motion of the measuring standard in relation to the optical scanner unit taking place.

13. The method according to claim 11, further comprising recording the measured variable for a plurality of different, specific relative positions of the measuring standard in relation to a detection device of the optical scanner unit, the detection device including a plurality of detector elements which are set apart from each other along the measuring standard, to thereby determine the measured variable at different locations of the measuring standard.

14. The position-measuring device according to claim 2, wherein the monitor device is adapted to analyze variations of the examined measured variable as a function of the relative position of the measuring standard in relation to the optical scanner unit.

15. The method according to claim 13, wherein the measured variable is detected for the plurality of different relative positions of the measuring standard in relation to the detection device of the optical scanner unit, a rotary motion of the measuring standard in relation to the optical scanner unit taking place.

16. The position-measuring device according to claim 1, wherein errors in the angle of rotation determined based on the output signals of the optical scanner unit are correctable based on the comparison of the measured variable and the setpoint value.

17. The method according to claim 13, further comprising correcting errors in the position measurement based on the comparison of the measured variable and the setpoint value.

18. The position-measuring device according to claim 1, wherein the monitor device is adapted to distinguish between a bearing fault and contamination of the measuring standard.

19. The position-measuring device according to claim 18, wherein the monitor device is adapted to detect the bearing fault based on a periodicity of the amplitude of the output signals of the optical scanner unit, on which the angle of rotation associated with the relative movement of the measuring standard and the optical scanner unit is determinable, within one full rotation of the measuring standard and the optical scanner unit and to detect the contamination of the measuring standard based on a lack of periodicity of the amplitude of the output signals of the optical scanner unit, on which the angle of rotation associated with the relative movement of the measuring standard and the optical scanner unit is determinable, within one full rotation of the measuring standard and the optical scanner unit.

20. The method according to claim 11, further comprising distinguishing, by the monitor device, between a bearing fault and contamination of the measuring standard.

21. The method according to claim 20, wherein the distinguishing between the bearing fault and the contamination of the measuring standard includes detecting the bearing fault based on a periodicity of the amplitude of the output signals of the optical scanner unit, on which the angle of rotation associated with the relative movement of the measuring standard and the optical scanner unit is determinable, within one full rotation of the measuring standard and the optical scanner unit and detecting the contamination of the measuring standard based on a lack of periodicity of the amplitude of the output signals of the optical scanner unit, on which the angle of rotation associated with the relative movement of the measuring standard and the optical scanner unit is determinable, within one full rotation of the measuring standard and the optical scanner unit.

22. A position-measuring device, comprising:

a measuring standard;

an optical scanner unit adapted to scan the measuring standard for position-determination;

a rotary bearing, the measuring standard and the optical scanner unit being rotatable in relation to each other via the rotary bearing when the position-measuring device is in operation, the optical scanner unit adapted to generate output signals, on which an angle of rotation associated with the relative movement of the measuring standard and the optical scanner unit is determinable; and a monitor device adapted to monitor the rotary bearing for occurrence of bearing faults by detection and analysis of at least a phase of the output signals of the optical scanner unit, on which the angle of rotation associated with the relative movement of the measuring standard and the optical scanner unit is determinable, at each of a plurality of different, specific relative positions of the measuring standard in relation to a detector device of the optical scanner unit during a revolution, by comparing the phase of the output signals of the optical scanner unit, on which the angle of rotation associated with the relative movement of the measuring standard and the optical scanner unit is determinable, at each of the specific relative positions to a respective setpoint value for each specific relative position, the monitor device adapted to determine a bearing fault based on the detection, analysis, and comparison.

23. The position-measuring device according to claim 22, wherein the monitor device is adapted to monitor the rotary bearing for occurrence of bearing faults by detection and analysis of (a) the phase of the output signals of the optical scanner unit, on which the angle of rotation associated with the relative movement of the measuring standard and the optical scanner unit is determinable, and (b) an amplitude of the output signals of the optical scanner unit, on which the angle of rotation associated with the relative movement of the measuring standard and the optical scanner unit is determinable, for the plurality of different, specific relative positions of the measuring standard in relation to the detector device of the optical scanner unit, by comparing (a) the phase of the output signals of the optical scanner unit, on which the angle of rotation associated with the relative movement of the measuring standard and the optical scanner unit is determinable, and (b) the amplitude of the output signals of the optical scanner unit, on which the angle of rotation associated with the relative movement of the measuring standard and the optical scanner unit is determinable, at each specific relative position to the setpoint value for each specific relative position.

24. A method for operating a position-measuring device, comprising:

scanning a measuring standard by an optical scanner unit for a position measurement while the measuring standard and the optical scanner unit are rotated with respect to each other by a rotary bearing;

checking the rotary bearing for bearing faults by a monitor device while the position-measuring device is in operation;

detecting and analyzing, by the monitor device, at least a phase of the output signals of the optical scanner unit, on which the angle of rotation associated with the relative movement of the measuring standard and the optical scanner unit is determinable, at each of a plurality of different, specific relative positions of the measuring standard in relation to a detection device of the optical scanner unit during a revolution, by comparing the phase of the output signals of the optical scanner unit, on which the angle of rotation associated with the relative movement of the measuring standard and the optical scanner unit is determinable, at each of the specific relative positions to a respective setpoint value for each specific relative position; and determining a bearing fault based on the detecting, analyzing, and comparing.

25. The method according to claim 24, wherein the detecting and analyzing includes detecting and analyzing, by the monitor device, (a) the phase of the output signals of the optical scanner unit, on which the angle of rotation associated with the relative movement of the measuring standard and the optical scanner unit is determinable, and (b) an amplitude of output signals of the optical scanner unit, on which the angle of rotation associated with relative movement of the measuring standard and the optical scanner unit is determinable, for the plurality of different, specific relative positions of the measuring standard in relation to the detection device of the optical scanner unit, by comparing (a) the phase of the output signals of the optical scanner unit, on which the angle of rotation associated with the relative movement of the measuring standard and the optical scanner unit is determinable, and (b) the amplitude of the output signals of the optical scanner unit, on which the angle of rotation associated with the relative movement of the measuring standard and the optical scanner unit is determinable, at each specific relative position to the setpoint value for each specific relative position.

* * * * *